UNITED STATES PATENT OFFICE.

OTTO A. BAILER, OF PHILADELPHIA, PENNSYLVANIA.

PROCESS OF PRODUCING A COMPOSITION OF MATTER TO BE USED AS A SUBSTITUTE FOR RUBBER.

SPECIFICATION forming part of Letters Patent No. 708,003, dated September 2, 1902.

Application filed December 27, 1901. Serial No. 87,478. (No specimens.)

*To all whom it may concern:*

Be it known that I, OTTO A. BAILER, a citizen of the United States, residing at No. 3412 Germantown avenue, in the city and county of Philadelphia and State of Pennsylvania, have invented a new and useful Process of Producing a Composition of Matter to be Used as a Substitute for Rubber, of which the following is a specification.

My invention relates to processes whereby certain ingredients are combined and treated in order to form a resulting composition that may be employed for a variety of purposes for which rubber is now used; and my object is more particularly to produce a substance having a high degree of durability and resiliency in a more expeditious manner and at less cost than heretofore.

My process is as follows: Rubber in its crude state is cut or dissolved in benzin or gasolene, the proportion of rubber to the solvent being such that the resulting mixture has about the consistency of syrup. To this are added sulfur, whiting, and melted or liquid gum-arabic, the proportions being substantially ten (10) per cent. of gum-arabic, twenty (20) per cent of rubber, twenty-five (25) per cent. of whiting, and forty-five (45) per cent. of sulfur. The compound of benzin or gasolene, rubber, sulfur, whiting, and gum-arabic is then strained, and if the resulting solution is too thick benzin or gasolene is added to bring it to about the consistency of syrup or just to the flowing-point. My next step is to cleanse a quantity of feathers with benzin or any suitable cleansing medium in order to remove all oil therefrom. The feathers are then subjected to pressure to squeeze out or remove the benzin. If too large, they are cut or chopped up into shorter sections and thoroughly mixed into the solution above described. The proportion, by weight, is about three parts of feathers to one part of the solution. The entire composition is then spread out in a shallow pan, where it is allowed to dry out until of a viscous semisolidified consistency. It is then subjected to pressure in order to mold the composition into the form which it is finally to assume in the finished article. The pressure need not be more than sufficient to cause the composition to retain its desired shape during the next and final step—that of vulcanization. The vulcanization being performed in the ordinary manner, the resulting article formed from the above substance and in the manner described is hard, compact, and resilient.

What I claim as my invention, and desire to secure by Letters Patent, is—

The above-described process of producing a rubber substitute by forming a solution by mixing gum-arabic, rubber dissolved in benzin, whiting and sulfur, in the proportions substantially of ten per cent. of gum-arabic, twenty per cent. of rubber, twenty-five per cent of whiting and forty-five per cent. of sulfur, adding feathers to the above solution in the proportion of three parts by weight of feathers to one part of the solution, semi-drying the whole, pressing into the desired form and vulcanizing, substantially as and in the manner described.

In testimony whereof I have signed my name to this specification in the presence of two subscribing witnesses.

OTTO A. BAILER.

Witnesses:
JOHN SHEAN,
H. B. SCHERMERHORN.